Dec. 1, 1959   WOLF-DIETER BENSINGER ET AL   2,914,964
BALANCING MECHANISM FOR MULTI-CYLINDER PISTON ENGINES
Filed Feb. 14, 1955
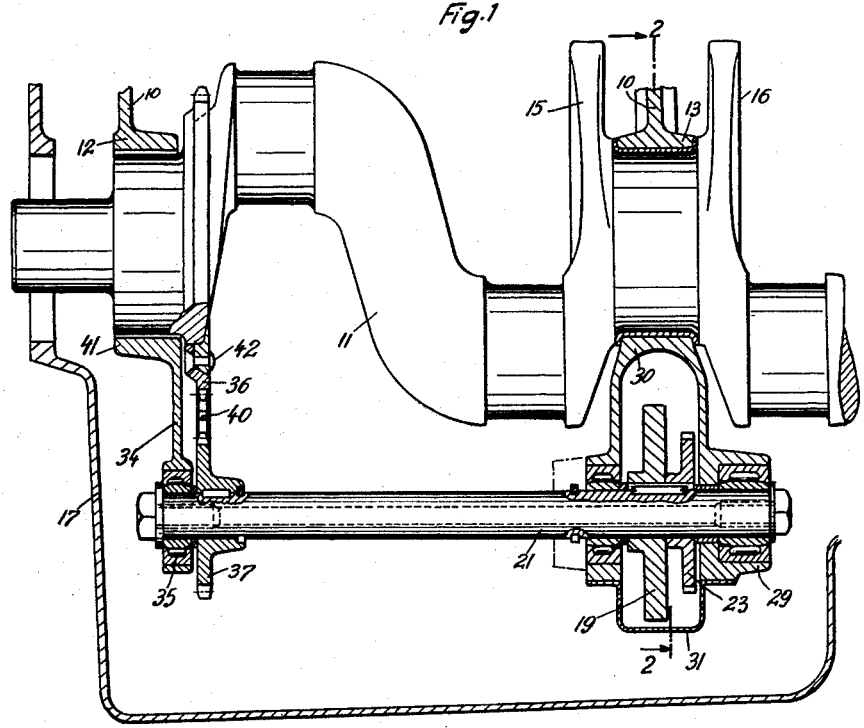
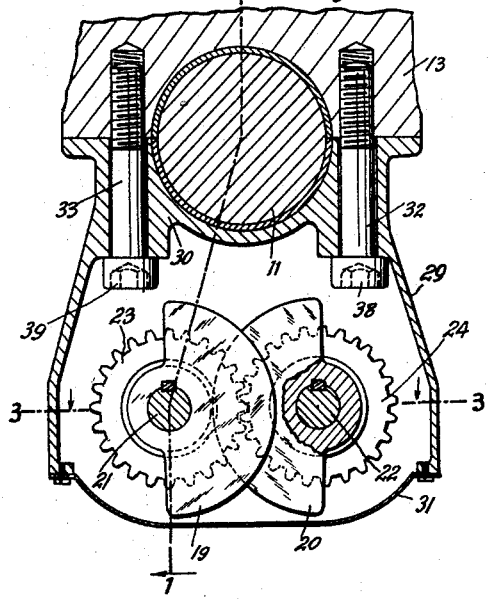
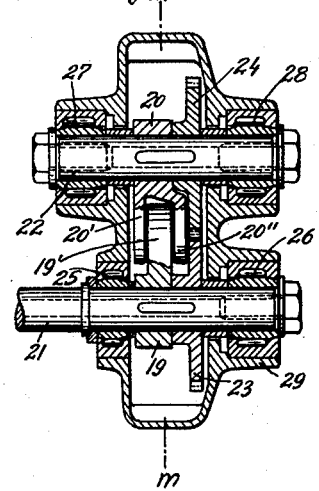
Inventors
WOLF-DIETER BENSINGER
and MARTIN FRITZ
BY Dicke and Craig.
ATTORNEYS.

United States Patent Office
2,914,964
Patented Dec. 1, 1959

2,914,964

BALANCING MECHANISM FOR MULTI-CYLINDER PISTON ENGINES

Wolf-Dieter Bensinger, Stuttgart-Unterturkheim, and Martin Fritz, Oberurbach, near Schorndorf, Germany, assignors to Daimler-Benz Aktiengesellschaft, Stuttgart-Unterturkheim, Germany Application February 14, 1955, Serial No. 487,957

Claims priority, application Germany February 13, 1954

12 Claims. (Cl. 74—604)

Our invention relates to a multi-cylinder piston engine and, more particularly, to a balancing mechanism for balancing the free mass forces of the second degree produced by the reciprocating elements of the engine.

It is an object of the invention to provide a simple and compact mechanism of this character which may be easily installed and disassembled and is preferably adapted to be installed in the crank case of existing engines.

It is another object of our invention to provide a balancing mechanism including a pair of rotary elements geared to rotate in opposite directions at twice the rate of speed of the crankshaft, said elements constituting eccentric masses balancing said free mass forces.

It is a further object of our invention to provide a mechanism of the character indicated and driving means therefor which produce a minimum of noise.

Further objects of our invention will appear from a detailed description of a preferred embodiment thereof which is illustrated in the drawings. We wish it to be understood, however, that such detailed description serves the purpose of illustrating the invention rather than that of limiting or restricting the same.

In the drawings,

Fig. 1 is a partial longitudinal section of an internal combustion engine showing part of the crankshaft and our novel balancing mechanism coordinated thereto, the section being taken along the line 1—1 shown in Fig. 2;

Fig. 2 is the vertical transverse section through the crankshaft and the balancing mechanism along the line 2—2 indicated in Fig. 1, and Fig. 3 is a horizontal section through the balancing mechanism, said section being taken along the line 3—3 of Fig. 2.

A four-cylinder internal combustion engine having a cylinder housing 10 is provided with a four-throw crankshaft 11 journalled in three line bearings, of which bearings 12 and 13 only are shown in the drawings, each bearing being composed of an upper basic portion integral with the housing 10 and of a lower detachable cover part, such as 30, detachably bolted to the upper basic portion by a pair of screws, such as 32, 33. On either side of the central line of bearing 13 the crankshaft is provided with counterweights 15, 16 in a well known manner. An oil pan 17 is detachably flanged by suitable means not shown to the housing 10 so as to form the crank case therewith. The bottom portion of the oil pan constitutes an oil sump.

For the purpose of reducing the vibration produced by the free mass forces of the reciprocating elements cooperatively connected with the crankshaft, we have provided a balancing mechanism comprising a pair of rotary masses secured to shafts 21 and 22 which extend in the common horizontal plane 3—3 parallel to the crankshaft symmetrically disposed with respect to a vertical plane which includes the axis of the line bearings, such as 12 and 13. These shafts 21 and 22 are geared to each other to rotate in opposite directions. One of the rotary masses is composed of two spaced sector-shaped parallel disks 20' and 20" projecting from a common hub portion 20 keyed to shaft 22. The rotary mass secured to shaft 21 is formed by a single sector-shaped disk 19' which projects radially from a hub 19 keyed to shaft 21 and is straddled by the disks 20', 20" in such a manner that on any revolution the single disk 19' passes through the space between the disks 20' and 20". Directly adjacent to the hub portion 19 of the eccentric mass 19, 19', a gear 23 is keyed to shaft 21 and meshes with a gear 24 keyed to shaft 22 adjacent to hub portion 20, whereby the two shafts are geared for rotation in opposite directions. The disks 19, 20' and 20" are so dimensioned and made of such a material that their common center of gravity will always be positioned within a longitudinal vertical plane which includes the axis of the crankshaft and substantially within the transverse plane 2—2.

The shafts 21 and 22 are journalled for rotation in anti-friction bearings 25, 26, 27 and 28 carried by the side walls of a housing 29 which is constituted by the cover part 30 of the central line bearing or, viewed from another aspect, is formed by a depending projection of such cover part 30. Preferably, the housing 29 is integral with the cover part 30. At its bottom the housing 29 is sealed by a suitable bottom cover 31 removably secured by suitable means (not labeled). The heads 38 and 39 of the screws 32 and 33 are located within the housing 29. The shafts 21, 22 and the other elements enclosed thereby are so disposed in the housing 29 that the heads 38, 39 are accessible upon removal of the bottom cover 31 for rotation by a suitable wrench so that the detachable cover part 30 and the housing 29 integral therewith may be readily attached or detached to the cylinder housing 10.

Suitable means are provided for gearing the rotary elements 21, 19, 19' and 22, 20, 20', 20" to the crankshaft 11 for rotation at twice the rate of speed thereof to thereby balance the free mass forces of the second degree produced by the reciprocation of the connecting rods and pistons (not shown). In the embodiment shown, such means comprises an extension of shaft 21 extending from the housing 29 parallel to the axis of crankshaft 11 substantially to one of the ends of crankshaft 11 and a pair of toothed elements, such as sprockets 36, 37, cooperating with a chain 40. The extension of shaft 21 is journalled in an anti-friction bearing 35 supported by a bracket 34 constituting a depending projection of the cover part 41 of line bearing 12. The cover part 41 is detachably secured to the basic portion of line bearing 12 by a pair of screws which are not shown, but are similar to screws 32 and 33. The anti-friction bearings 25, 26, 27, 28 and 35 are preferably roller bearings or needle bearings.

The sprocket 36 which has twice the diameter of sprocket 37 is mounted on the crankshaft directly inside of line bearing 12 disposed at the end of the crankshaft 11, the sprocket being secured to the crankshaft by suitable means, such as rivets 42. The sprocket 37 is secured to the shaft 21 closely adjacent to the bearing 35 carried by the bracket 34.

If desired, the toothed elements 36 and 37 may constitute meshing gears in lieu of sprockets.

From the foregoing description it will appear that the entire mechanism for balancing the free mass forces of the second degree produced by the reciprocating pistons and connecting rods of the engine is supported solely by the cover parts 30 and 31 of the line bearings 13 and 12 of the crankshaft. In order to equip an existing engine with our novel balancing mechanism, it is only necessary to remove the two detachable cover parts of the line bearing, and to substitute therefor the novel cover parts, such as 30 and 31, formed integral with the bearing-supporting elements described hereinabove, and to mount the sprocket 36 on the crankshaft, and to assemble the chain 40.

The invention is of particular utility for, although not limited to, high speed four-cylinder engines, such as used in motor vehicles.

Thus, it will appear that we have provided a simple, compact balancing mechanism which may be readily installed in and disassembled from the engine, such mechanism including rotary masses mounted on parallel shafts preferably carried by the cover part of a line bearing, more particularly the central line bearing. Preferably, such line bearing is formed with a housing accommodating the rotary balancing masses and preferably the bearings for the pair of parallel shafts carrying such masses and a pair of gears for gearing the same for rotation in opposite directions. Also the screws for securing the housing-shaped cover part of the bearing to the basic portion of the bearing are disposed inside of the housing, but are accessible from the outside. By shaping the cover part of the line bearing as a housing for accommodating the rotary masses, great stiffness of the housing will be combined with a low weight, the housing being of compact shape requiring but a minimum of space. Moreover, the housing will reduce the noise produced by the mechanism. Also, the balancing mechanism may be readily applied to existing engines, since it does not require more space than available in any normal oil pan.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In a multi-cylinder piston engine, the combination comprising a multi-throw crankshaft, an oil pan therebelow, at least one line bearing for said crankshaft, said bearing including a detachable cover part formed with a housing, said housing being closed to seal the inside thereof against the outside, and extending into said oil pan, rotary elements constituting balancing masses carried by said journal in said housing, and means for gearing said elements to said crankshaft for rotation at twice the rate of speed thereof to balance the free mass forces of the second degree of said engine.

2. The combination claimed in claim 1 in which said rotary elements include a pair of parallel shafts, said housing being provided with bearings for said shafts, means being provided in said housing for gearing said shafts for rotation in opposite directions.

3. The combination claimed in claim 1 in which said rotary elements are constituted by a pair of parallel shafts geared for rotation in opposite directions, by an eccentric disk-shaped mass secured to one of said shafts, and by a pair of eccentric disk-shaped masses secured to the other one of said shafts so as to straddle said first mentioned mass.

4. In a four-cylinder piston engine, the combination comprising a four-throw crankshaft, line bearings therefor including a central line bearing, a detachable cover constituting part of said central line bearing and formed with a depending projection shaped as a housing, said housing being closed to seal the inside thereof against the outside, a pair of parallel shafts journalled in said housing, a pair of meshing gears encased by said housing, each of said gears being secured to one of said shafts, at least one of said shafts being geared to said crankshaft for rotation at twice the rate of speed thereof, and eccentric masses provided on said shafts for balancing the free mass forces of the second degree of said engine.

5. The combination claimed in claim 4 in which said central line bearing is composed of a basic portion and of said cover, screws being provided to detachably secure said cover to said basic portion and having heads located within said housing, said housing having a removable bottom cover and said shafts and said eccentric masses being so disposed in said housing that said heads are accessible upon removal of said bottom cover.

6. The combination claimed in claim 4 in which said shafts geared for rotation in opposite directions are disposed symmetrically with respect to a vertical plane which includes the axis of said line bearings.

7. The combination claimed in claim 4 in which said meshing gears are mounted on said shafts directly adjacent to said eccentric masses.

8. In a multi-cylinder piston engine, the combination comprising a multi-throw crankshaft, line bearings therefor, at least one of said line bearings including a detachable cover part constituting a housing, said housing being closed to seal the inside thereof against the outside, rotary elements journalled in said housing and constituting eccentric masses, means for gearing said elements to said crankshaft for rotation at twice the rate of speed thereof to thereby balance the free mass forces of the second degree of said engine, said means including a shaft extending parallel to said crankshaft from said housing to a point adjacent to the end of said crankshaft, and means for gearing the end of said shaft to said end of said crankshaft.

9. The combination claimed in claim 8 in which said means for gearing the end of said shaft to said end of said crankshaft includes a pair of sprockets and a chain cooperating therewith.

10. The combination claimed in claim 8 in which said means for gearing the end of said shaft to said end of said crankshaft includes a pair of toothed elements.

11. The combination claimed in claim 8 in which said means for gearing the end of said shaft to said end of said crankshaft includes a pair of toothed elements, one of the same being mounted on said crankshaft directly inside of such one of said line bearings as is disposed at said end of said crankshaft.

12. The combination claimed in claim 8 in which one of said line bearings, in which said end of said crankshaft is journalled, is formed with a detachable cover part formed with a depending projection, a bearing provided in said projection rotatably supporting said end of said shaft.

References Cited in the file of this patent

UNITED STATES PATENTS

| 1,163,832 | Lanchester | Dec. 14, 1915 |
| 1,588,720 | Gilbert | June 20, 1926 |
| 1,658,979 | Fisher | Feb. 14, 1928 |
| 1,738,876 | Edwards et al. | Dec. 10, 1929 |
| 1,762,860 | Gilbert | June 10, 1930 |
| 1,903,080 | Woolson | Mar. 28, 1933 |
| 2,214,921 | Criswell | Sept. 17, 1940 |
| 2,407,102 | Ryder | Sept. 3, 1946 |
| 2,688,839 | Daub | Sept. 14, 1954 |